May 26, 1964 H. A. SCHURICHT 3,134,472
FLEXIBLE CHUTE
Filed April 14, 1961 2 Sheets-Sheet 1
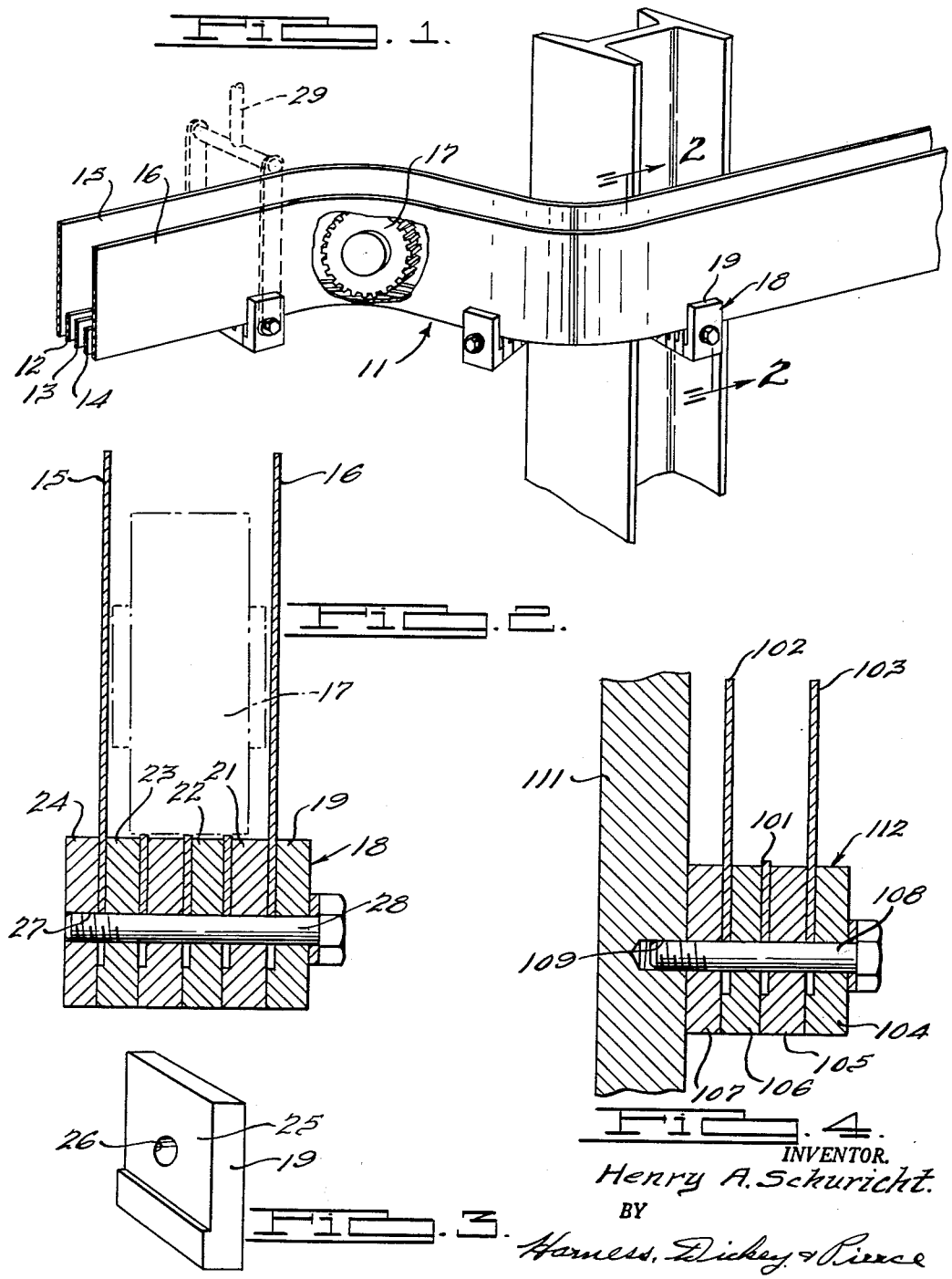
INVENTOR.
Henry A. Schuricht.
BY
Harness, Dickey & Pierce
ATTORNEYS.

May 26, 1964  H. A. SCHURICHT  3,134,472
FLEXIBLE CHUTE

Filed April 14, 1961  2 Sheets-Sheet 2

INVENTOR.
Henry A. Schuricht.
BY
Harness, Dickey & Pierce
ATTORNEYS.

United States Patent Office 3,134,472
Patented May 26, 1964

3,134,472
FLEXIBLE CHUTE
Henry A. Schuricht, Pontiac, Mich., assignor, by mesne assignments, to Hydromation Engineering Company, Plymouth, Mich., a corporation of Michigan
Filed Apr. 14, 1961, Ser. No. 103,018
3 Claims. (Cl. 193—25)

This invention relates to flexible chutes, and more particularly to chutes for conveying semi-finished parts between stations in a factory.

It is an object of the invention to provide a novel and improved flexible chute of this nature which is especially adapted for smaller workpieces, and which may be quickly and easily installed in a variety of positions.

It is another object to provide an improved flexible chute of this character in which a minimum number of parts are required, the chute elements being capable of arrangement in varying widths and heights to accommodate particular workpieces.

It is a further object to provide an improved flexible chute construction having the above characteristics, which is capable of being supported along its run in a number of different ways, thus increasing the versatility of the equipment.

Other objects, features, and advantages of the present invention will become apparent from the subsequent description, taken in conjunction with the accompanying drawings.

In the drawings:

FIGURE 1 is a perspective view of one embodiment of the improved flexible chute of this invention, illustrating the manner in which the chute may be formed to achieve various configurations;

FIGURE 2 is a view taken along the line 2—2 of FIGURE 1 and showing the stacked construction of the clamping elements;

FIGURE 3 is a perspective view of a single clamping element;

FIGURE 4 is a view of a modified form of the invention, using less clamping elements than are shown in FIGURE 2, with the bolt connecting the clamping elements being threaded directly into a stationary support;

Figure 5:
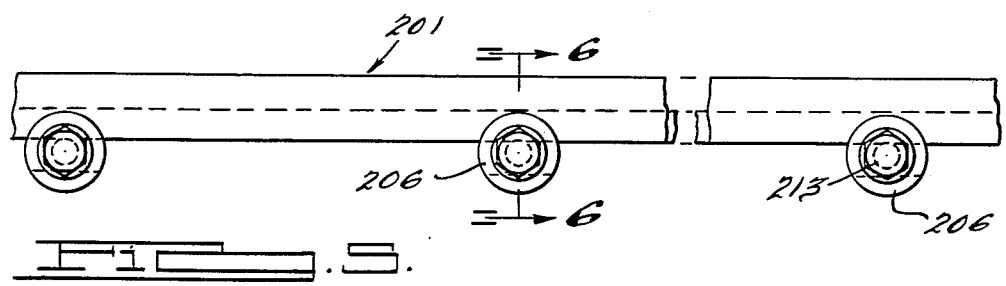
FIGURE 5 is a side elevational view of another embodiment of the invention in which integral clamp assemblies for the bands are used.

In general terms, the invention comprises a plurality of flexible steel bands in parallel relation, the two outer bands serving as guides for semi-finished workpieces such as gears, while the intermediate band or bands serve to support these workpieces. The bands are held together by clamp assemblies at spaced points therealong. These clamp assemblies are of extremely simplified form, comprising in one embodiment a stack of rectangular blocks having flat recesses on corresponding sides so as to provide slots for receiving the band edges. In another embodiment, each clamp assembly is of integral construction, comprising a cylindrical member with slots cut therein in parallel relation to receive the band edges. Bolts passing through the clamp assemblies serve in both instances to draw the clamp elements against the band edges, thus frictionally securing them in position. The bolts may also coact with the means for supporting the chute by the adjacent stationary structure.

Referring more particular to the drawings, the embodiment of the chute shown in FIGURES 1 to 3 is generally indicated at 11 and comprises three steel supporting bands 12, 13 and 14 and two side bands 15 and 16 in parallel relation. These bands may be fabricated of steel and are of a flexible nature, side bands 15 and 16 being wider (or in their illustrated position, higher) than bands 12, 13 and 14. The height of bands 15 and 16, and the number and spacing of bands 12, 13 and 14 are so chosen as to accommodate parts such as gears 17 shown in FIGURE 1 which in their semi-finished condition are required to be transferred from one station to another in a factory. As shown, gear 17 may be supported on its circumference by the upper edges of bands 12, 13 and 14, with the sides of the gear being guided by members 15 and 16.

Each clamp assembly is generally indicated at 18 and comprises a plurality of members 19, 21, 22, 23 and 24. Members 19 to 23 are of identical construction and one of these is shown in FIGURE 3. Each of these members comprises a rectangular metal block, one side of this block having a flat recess 25 extending downwardly about two-thirds the depth of the block. The depth of recess 25 is about equal to the thickness of bands 12 to 16, this thickness possibly being the same for all the bands. A bolt clearance aperture 26 is provided in a central portion of block 19, this aperture connecting with recess 25. Block 24 is of rectangular shape, of the same size as blocks 19 to 23 but without a recess similar to recess 25. Block 24 has a threaded aperture 27 for receiving a bolt 28.

In assembling the chute, the bands will be inserted in the slots formed by recesses 25 when the clamping elements are stacked and held together by bolt 28. As shown in FIGURE 2, the height of blocks 19 to 23 above their apertures 26 will be slightly less than the height of bands 12, 13 and 14, so that the upper edges of these bands will be above the clamping elements as seen in FIGURE 2 when the lower edges rest on bolt 28.

When the bands are assembled with a plurality of clamp assemblies 18 at properly spaced points, the chute may be flexed to conform to any desired configuration, as seen in FIGURE 1. Upon tightening of bolts 28, the bands will be held in their flexed position by frictional contact of the clamp assemblies with the bands.

In order to support chute 11, suspension brackets such as that indicated by dash lines at 29 in FIGURE 1 may be used. These brackets may be attached to certain bolts 28 which are made slightly longer than the others, with the apertures 27 in blocks 24 for these clamps being clearance apertures rather than threaded apertures to permit the bolts 28 to pass through and receive nuts on the outside of bracket 29.

In certain cases, as shown in FIGURE 4, the narrow size of the workpieces may only require a single supporting band as indicated at 101 with two guide bands 102 and 103. In this case, only three recessed clamping elemens 104, 105 and 106 will be necessary, together with an end clamping member 107. Bolt 108 in this case may be threaded directly into an aperture 109 in a stationary support 111. The clamp assembly, generally indicated at 112, will thus serve both as a clamp for the band and as a support for the chute.

It should be noted that since blocks 19 to 23 are of identical shape, it will be relatively easy to stock parts in a factory for assembling chutes of varying width as needed.

Figure 6:
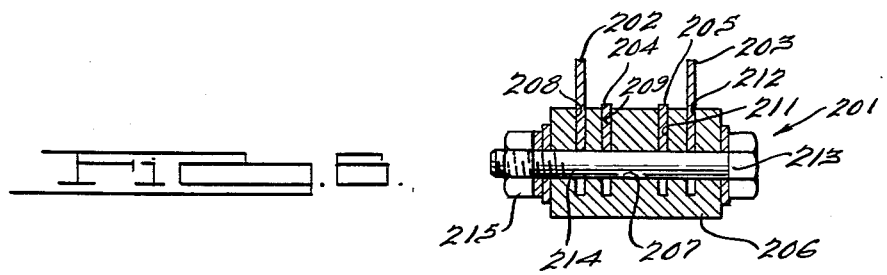
FIGURE 6 is a view taken along line 6—6 of FIGURE 5 showing the integral clamp assembly construction.
Figure 7:
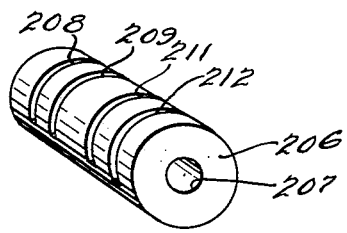
FIGURE 7 is a perspective view of the integral clamping element.

FIGURES 5 to 7 show another embodiment of the invention especially adapted for use with relatively small parts, where the height of the side bands need not be as great. This chute is generally indicated at 201 and comprises a first pair of outer guide bands 202 and 203, and a pair of inner or supporting bands 204 and 205. These bands are, as previously, fabricated of flexible and resilient steel strips, cut to the required lengths, with bands 204 and 205 being of lesser height than the guide bands.

Clamp assemblies 206 are constructed as shown best in FIGURES 6 and 7, each assembly comprising a section of a cylindrical rod, the clamp having an axially extending central bolt aperture 207. A plurality of radially extending axially spaced slots 208, 209, 211 and 212 are formed in clamp 206, the depth of these slots being such that they extend past centrally located bore 207. The width of slots 208 to 212 is about equal to the thickness of bands 202 to 205.

In use, bolts 213 will be inserted in bores 207 and bands 202 to 205 placed in slots 208 to 212, as shown in FIGURE 6. The lower edges of the bands will engage shank 214 of bolt 213, the widths of the bands being such that when so positioned the upper edges of bands 204 and 205 will be slightly above the surfaces of the clamps and bands 202 and 203 will be somewhat higher so as to serve as workpiece guides.

Upon forming of the chute in its desired position, nuts 215 may be tightened, thus causing the upper portions of the clamps to be drawn together, securing the bands to the clamps. The action will thus be similar to that of the first embodiment, and the clamping members will serve to hold the chute in a curved configuration. Where desired, supports such as those indicated at 29 in FIGURE 1 may be used in conjunction with clamps 206.

It will be observed that the number and location of the slots in rod 206, as well as the length of the rod, may be varied to suit requirements.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a flexible chute, a pair of side bands of spring steel, at least one workpiece-supporting band of spring steel disposed between said side bands and of lesser height, the side bands and supporting band being in spaced parallel relation with their lower ends substantially in a common plane, a plurality of clamp assemblies secured at spaced points along said bands, each of said clamp assemblies comprising a length of cylindrical rod having a central axial clearance bore for receiving a threaded fastener, a plurality of radially extending axially spaced slots in said rod of the same width as the thickness of said bands, said slots extending inwardly from one side of said rod a substantial distance past said bore, said bands being disposed within said slots, and a threaded fastener passing through said bore for compressing said rod in axial direction to frictionally clamp said bands.

2. In a clamping construction for a flexible chute of the type having a plurality of steel bands in spaced parallel relation, a section of cylindrical rod having a central axial bore, a plurality of radial slots extending partially through said rod from one side thereof and past said bore, and a threaded fastener extending through said bore and adapted to draw the ends of said rod together so as to tend to close said slots.

3. In a flexible chute, a pair of side bands of spring steel, at least one workpiece-supporting band of spring steel disposed between said side bands and of lesser height, the side bands and supporting band being in spaced parallel relation with their lower ends substantially in a common plane, a plurality of clamp assemblies secured at spaced points along said bands, each of said clamp assemblies comprising a length of rod having a central axial clearance bore for receiving a threaded fastener, a plurality of radially extending axially spaced slots in said rod of the same width as the thickness of said bands, said slots extending inwardly from one side of said rod a substantial distance past said bore, said bands being disposed within said slots, and a threaded fastener passing through said bore for compressing said rod in axial direction to frictionally clamp said bands.

References Cited in the file of this patent
UNITED STATES PATENTS

| | | |
|---|---|---|
| 2,815,841 | Dabich | Dec. 10, 1957 |
| 2,947,401 | Schuricht et al. | Aug. 2, 1960 |